United States Patent

Van Veldhuizen et al.

[11] Patent Number: 5,841,238
[45] Date of Patent: Nov. 24, 1998

[54] DIMMER PROTECTION FOR COMPACT FLUORESCENT

[75] Inventors: Robert H. Van Veldhuizen, Terneuzen; Leonardus G. J. Verhees, Eindhoven, both of Netherlands

[73] Assignee: U.S. Philips Corporation, New York, N.Y.

[21] Appl. No.: 733,292

[22] Filed: Oct. 17, 1996

[30] Foreign Application Priority Data

Oct. 18, 1995 [EP] European Pat. Off. .............. 95202816

[51] Int. Cl.⁶ .................................................. H05B 37/02
[52] U.S. Cl. .......................... 315/119; 315/224; 315/225
[58] Field of Search .................................. 315/119, 224, 315/225, 209 R, DIG. 4, DIG. 5

[56] References Cited

U.S. PATENT DOCUMENTS

| | | | |
|---|---|---|---|
| 4,554,487 | 11/1985 | Nilssen | 315/224 |
| 4,647,820 | 3/1987 | Chermin et al. | 315/245 |
| 4,935,672 | 6/1990 | Lammers et al. | 315/200 |
| 5,151,631 | 9/1992 | Oda et al. | 315/127 |
| 5,461,287 | 10/1995 | Russell et al. | 315/209 R |

*Primary Examiner*—Don Wong
*Assistant Examiner*—David H. Vu
*Attorney, Agent, or Firm*—Edward Blocker

[57] ABSTRACT

A circuit arrangement for operating a discharge lamp (LA), provided with input terminals (K1, K2) for connection to a supply voltage source. A rectifier (D1–D4) is coupled to the input terminals for rectifying a supply voltage delivered by the supply voltage source. A capacitor (C2) is coupled to the rectifier and a DC-AC converter (III) is coupled to the capacitor and is provided with terminals for accommodating a discharge lamp. The circuit arrangement is also provided with a circuit I (R1–R6. T1, T2, C1, V, VI, VII) for detecting periodic current pulses having an amplitude greater than a given value W1 and with a circuit II (IIa, S1) coupled to the circuit I for changing the operational state of the circuit arrangement. As a result, damage to the circuit arrangement is prevented when the circuit arrangement is used in combination with a dimmer unsuitable for the circuit arrangement.

13 Claims, 3 Drawing Sheets

5,841,238

DIMMER PROTECTION FOR COMPACT FLUORESCENT

BACKGROUND OF THE INVENTION

This invention relates to a circuit arrangement for operating a discharge lamp, provided with
- input terminals for connection to a supply voltage source,
- rectifying means coupled to the input terminals for rectifying a supply voltage delivered by the supply voltage source,
- capacitive means coupled to the rectifying means, and
- a DC-AC converter coupled to the capacitive means and provided with terminals for connection to a discharge lamp.

The invention also relates to a compact discharge lamp provided with a lamp cap having electrical contacts and with such a circuit arrangement.

A circuit arrangement as mentioned in the opening paragraph is known from U.S. Pat. No. 4,935,672. The known circuit arrangement is widely used in compact discharge lamps such as compact fluorescent lamps which are each provided with a lamp cap having electrical contacts as used also for incandescent lamps. Thanks to the similar lamp caps, the compact fluorescent lamp is suitable for use in many applications where incandescent lamps were formerly used exclusively. Important advantages of the compact fluorescent lamp over the incandescent lamp are the considerably longer life and the considerably lower power consumption. A disadvantage of the compact fluorescent lamps compared with incandescent lamps is that it is very often impossible to dim the compact fluorescent lamps by means of a dimmer designed for incandescent lamps. Many users of such compact discharge lamps, however, are not aware of this. Dimming is realized in most dimmers designed for incandescent lamps in that the dimmer interrupts the supply voltage during a portion of each half cycle of the supply voltage. An incandescent lamp behaves largely as an ohmic resistor. When an incandescent lamp is dimmed by means of such a dimmer, this means that the incandescent wire of the incandescent lamp does not pass current during a portion of each half cycle of the supply voltage. During the remaining portion of each half cycle, the incandescent wire passes a current which is approximately equal to the current which flows through the incandescent wire of a non-dimmed incandescent lamp. A circuit arrangement for operating a discharge lamp as mentioned in the opening paragraph, however, often behaves as a capacitive impedance owing to the presence of the capacitive means. The current drawn from the supply voltage source is pulsatory and only flows during a comparatively short time interval of each half cycle of the supply voltage. If a dimmer designed for incandescent lamps is used in combination with such a circuit arrangement, the circuit arrangement may derive current pulses of a higher amplitude from the supply voltage source than is the case if the discharge lamp were not dimmed, in dependence on the time interval set during which the dimmer interrupts the supply voltage in each half cycle. As a result, components of the circuit arrangement may be damaged or their lives may be drastically shortened.

SUMMARY OF THE INVENTION

It is an object of the invention to provide a circuit arrangement for operating a discharge lamp, which circuit arrangement is not damaged and whose life is not shortened when it is used in combination with a dimmer unsuitable for the circuit arrangement. It is another object of the invention to provide a compact discharge lamp suitable for replacing incandescent lamps, which also does not become defective when used in combination with a dimmer which is not suitable for this compact discharge lamp.

A circuit arrangement as mentioned in the opening paragraph is for this purpose characterized in that the circuit arrangement is in addition provided with means I for detecting periodic current pulses having an amplitude greater than a given value WI and with means II coupled to the means I for changing the operational state of the circuit arrangement.

A compact discharge lamp as mentioned in the second paragraph is for this purpose characterized in that the compact discharge lamp is provided with a circuit arrangement according to the invention.

When a circuit arrangement according to the invention is used inadvertently or from ignorance in combination with a dimmer unsuitable for the circuit arrangement, periodic current pulses may flow through the input terminals, depending on the setting of the dimmer, whose amplitude is greater than the given value W1. These periodic current pulses are detected by the means I, which activate the means II. The means II subsequently change the operational state of the circuit arrangement. This change in the operational state is chosen such that the further occurrence of current pulses having an amplitude greater than the given value W1 is avoided thereby. Current pulses whose amplitude is higher than the given value W1 may also be caused by, for example, transients. It is highly improbable, however, for a comparatively great number of such current pulses to occur as a result of transients within a comparatively short time interval as is the case with the periodic current pulses caused by the use of a dimmer unsuitable for the circuit arrangement. The occurrence of transients, therefore, will not often give rise to the change in the operational state as effected by means II.

The means I can be realized in a simple manner by means of a current sensor and an integrator coupled to the current sensor. The current sensor is included in the circuit arrangement so that the current pulses supplied by the supply voltage source or a current derived from these current pulses flow(s) through the current sensor. The signal at the output of the integrator assumes a value which activates the means II when periodic current pulses occur with an amplitude higher than a given value. It is possible to dimension the integrator such that the value of the signal at the output at which the means II are activated is reached exclusively when a comparatively large number of current pulses of an amplitude greater than the given value W1 occurs within a comparatively short time interval. The latter is the case with periodic current pulses, but usually not with transients.

A very reliable embodiment of the means I comprises a current sensor, a comparator, a counter, and a timer circuit. As in the embodiment of the means I mentioned above, the current sensor passes the current pulses delivered by the supply voltage source, or a current derived therefrom, during lamp operation. The current sensor is coupled to a first input of the comparator. A signal which is a measure of the given value W1 is present at a second input of the comparator during lamp operation. An output of the comparator is connected to an input of the counter. Whenever a current pulse arises with an amplitude higher than the given value W1, the signal at the output of the comparator switches from low to high or vice versa. The counter thus counts the number of current pulses with an amplitude higher than the given value W1. The timer circuit resets the counter whenever a given time interval $\Delta t1$ has elapsed. If the number of current pulses counted by the counter within the given time interval $\Delta t1$ is higher than a given reference value, the counter will activate the means II.

Good results were found in practice when the means II comprise means for interrupting the supply voltage. Damage to components of the circuit arrangement as a result of current pulses having a too high amplitude are efficiently prevented in this way.

It was also found that a comparatively inexpensive and very efficient embodiment of the means II can be realized when the DC-AC converter is provided with one or several switching elements which are rendered alternately conducting and non-conducting during lamp operation, while the means II comprise means for rendering the switching elements non-conducting.

BRIEF DESCRIPTION OF THE DRAWING

Embodiments of a circuit arrangement and a compact discharge lamp according to the invention will be explained with reference to the accompanying drawing, in which.

DESCRIPTION OF THE PREFERRED EMBODIMENTS

Figure 1:
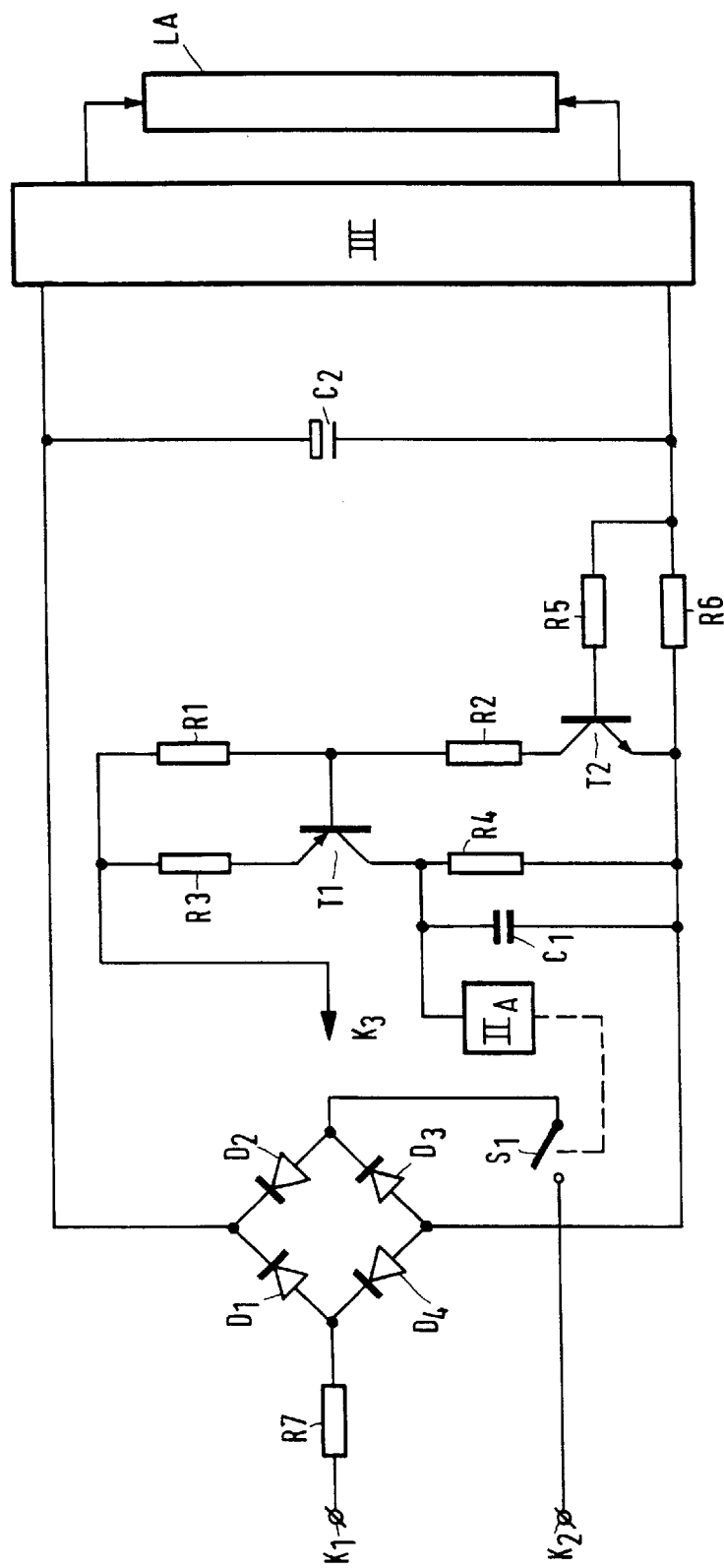
FIG. 1 is a circuit diagram of a first embodiment of a circuit arrangement according to the invention with a discharge lamp connected thereto.

In FIG. 1, K1 and K2 are input terminals for connection to a supply voltage source. R7 is a fusistor. Diodes D1–D4 form a diode bridge which in this embodiment forms rectifying means for rectifying a supply voltage delivered by the supply voltage source. Capacitor C2 forms capacitive means coupled to the rectifying means. Circuit portion III is a DC-AC converter provided with terminals to which a discharge lamp LA is connected. Terminal K3, transistors T1 and T2, ohmic resistors R1–R6, and capacitor C1 together form means I for detecting periodic current pulses having an amplitude higher than a given value W1. Ohmic resistor R6 is a current sensor. The remaining components of the means I together form an integrator. The given value W1 is defined by the dimensioning of this integrator. It is also laid down by means of the dimensioning that the value of the output signal at which the means II are activated is reached exclusively when a comparatively large number of current pulses having an amplitude greater than the given value W1 is reached within a comparatively short time interval. Circuit portion IIa and switching element S1 together form means II for changing the operational state of the circuit arrangement.

Input terminal K1 is connected to a first end of fusistor R7. A further end of fusistor R7 is connected to a first input of the diode bridge formed by diodes D1–D4. Input terminal K2 is connected to a further input of the diode bridge via switching element S1. A first output of the diode bridge is connected to a second output of the diode bridge via a series arrangement of capacitor C2 and ohmic resistor R6. A first and a further side of capacitor C2 are connected to respective inputs of circuit portion III. A first end of ohmic resistor R6 is connected to a first end of ohmic resistor R5. A further end of ohmic resistor R5 is connected to a base electrode of transistor T2. An emitter electrode of transistor T2 is connected to a further end of ohmic resistor R6. Ohmic resistor R2 connects a collector electrode of transistor T2 to a base electrode of transistor T1. The base electrode of transistor T1 is connected to an emitter electrode of transistor T1 via a series arrangement of ohmic resistor R1 and ohmic resistor R3. A common junction point of ohmic resistor R1 and ohmic resistor R3 is connected to terminal K3. An auxiliary supply voltage is present at terminal K3 during lamp operation, generated from the supply voltage by means not shown in FIG. 1. A collector electrode of transistor T1 is connected to the second output of the diode bridge by means of ohmic resistor R4. Ohmic resistor R4 is shunted by capacitor C1. A common junction point of transistor T1 and ohmic resistor R4 is connected to an input of circuit portion IIa. An output of circuit portion IIa is coupled to switching element S1. This coupling is indicated with a broken line in FIG. 1.

The operation of the embodiment shown in FIG. 1 is as follows.

When the circuit arrangement is switched on, circuit portion IIa renders the switching element S1 conducting. If a supply voltage source delivering a supply voltage, for example, a sinusoidal AC voltage, is connected to the input terminals K1 and K2, capacitor C2 is charged by current pulses of a frequency equal to twice the frequency of the sinusoidal AC voltage. The capacitor C2 supplies an operating current to circuit portion III and is discharged thereby. If the input terminals K1 and K2 are connected to the supply voltage source via a dimmer unsuitable for the circuit arrangement, however, the supply voltage is interrupted through the use of this dimmer, for example, during a portion of each half cycle of the supply voltage. The amplitude of the current pulses increases in dependence on the duration of the time interval during which the dimmer interrupts the supply voltage in each half cycle. Since the amplitude of the current pulses rises, the amplitude of the voltage pulses caused thereby across ohmic resistor R6 also rises to the point where transistor T2 enters the conducting state during a portion of each current pulse. This renders transistor T1 also conducting, and capacitor C1 is charged by the auxiliary supply voltage via ohmic resistor R3 and transistor T1. Capacitor C1 is discharged through resistor R4. If the current pulses having an amplitude higher than the given value W1 are periodical, the voltage across capacitor C1 reaches a value whereby the circuit portion IIa is activated after a comparatively short time interval. The circuit portion Ia then renders the switching element S1 non-conducting, so that the supply voltage is interrupted. In the case of non-periodic current pulses having an amplitude higher than the given value, for example, caused by transients, a comparatively long time interval will usually elapse between two consecutive non-periodic current pulses, in which time interval capacitor C1 will be discharged through ohmic resistor R4. As a result of this, the voltage across capacitor C1 does not reach the value at which the circuit portion IIa is activated.

Figure 2:
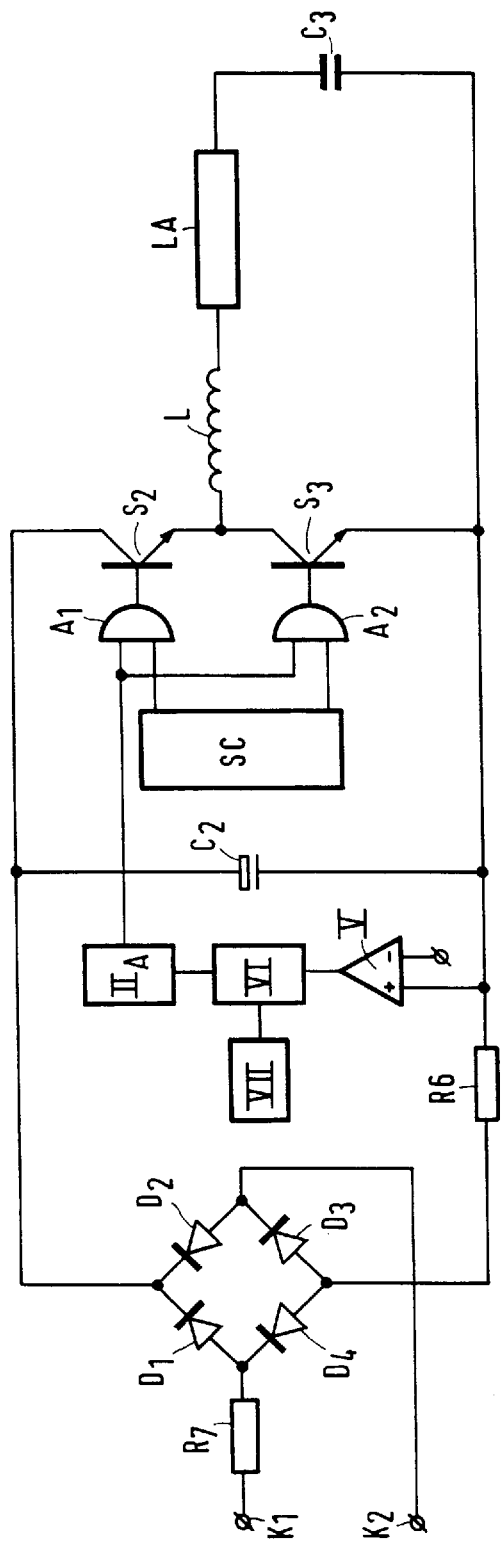
FIG. 2 is a circuit diagram of a second embodiment of a circuit arrangement according to the invention with a discharge lamp connected thereto.

In FIG. 2, components corresponding to components of the embodiment of FIG. 1 and having the same function have been given the same reference symbols. Means I in the embodiment of FIG. 2 are formed by circuit portions V, VI and VII and ohmic resistor R6. Circuit portion V is a comparator, circuit portion VI is a counter, and circuit portion VII is a timer circuit. Ohmic resistor R6 is a current sensor. Means II are formed by circuit portion IIa and AND gates A1 and A2. The DC-AC converter in this embodiment is formed by circuit portion SC, switching elements S2 and S3, ballast coil L, capacitor C3, and terminals not shown in FIG. 2 for holding a discharge lamp. A discharge lamp LA is connected to said terminals. Circuit portion SC is a control circuit for rendering switching elements S2 and S3 alternately conducting and non-conducting.

In the embodiment shown in FIG. 2, the input terminals K1 and K2, the diodes D1–D4, resistor R6, and capacitor C2 have been interconnected in the same manner as in the embodiment of FIG. 1. The first end of ohmic resistor R6 is connected to a first input of circuit portion V. A reference voltage generated by means not shown in FIG. 2 is present at a second input of circuit portion V during lamp operation. An output of circuit portion V is connected to a first input of circuit portion VI. A further input of circuit portion VI is connected to an output of circuit portion VII. An output of circuit portion VI is connected to an input of circuit portion IIa. An output of circuit portion IIa is connected to a first input of AND gate A1 and to a first input of AND gate A2. Respective outputs of circuit portion SC are connected to a second input of AND gate A1 and to a second input of AND gate A2. An output of AND gate A1 is connected to a control electrode of switching element S2. An output of AND gate A2 is connected to a control electrode of switching element S3. Capacitor C2 is shunted by a series arrangement of switching elements S2 and S3. A common junction point of switching element S2 and switching element S3 is connected to the first end of ohmic resistor R6 via a series arrangement of coil L, discharge lamp LA, and capacitor C3.

The operation of the embodiment shown in FIG. 2 is as follows.

As in the embodiment shown in FIG. 1, capacitor C2 is charged by periodic current pulses having a frequency twice the frequency of a sinusoidal supply voltage when the latter is connected to the input terminals K1 and K2, and the DC-AC converter is supplied from the capacitor C2. Switching elements S2 and S3 are rendered conducting and non-conducting alternately by circuit portion SC, whereby a current of alternating polarity is generated in the series circuit formed by ballast coil L, discharge lamp LA and capacitor C3.

However, if the input terminals K1 and K2 are connected to the supply voltage source via a dimmer which is unsuitable for the circuit arrangement, the use of this dimmer interrupts the supply voltage, for example, during a portion of each half cycle of the supply voltage. The amplitude of the current pulses rises in dependence on the time duration set for the time interval during which the dimmer interrupts the supply voltage in each half cycle. Since the amplitude of the current pulses rises, the amplitude of the voltage pulses caused thereby across ohmic resistor R6 also rises to the point where the voltage across ohmic resistor R6 is higher than the reference voltage during part of the duration of a current pulse. The reference voltage is a measure of the given value W1. The signal at the output of circuit portion V is high during that portion of each current pulse in which the voltage across ohmic resistor R6 is higher than the reference voltage, and low during the remaining time. Circuit portion VI counts the number of times the output of circuit portion V is high. Circuit portion VII resets circuit portion 6 whenever a given time interval Δt1 has elapsed. The circuit portion VI activates the circuit portion IIa when the number of times the signal at the output of circuit portion V has been high within the given time interval Δt1 is greater than a given reference value, whereupon the circuit portion IIa makes the signal at the first input of AND gate A1 and the first input of AND gate A2 low. This also makes the signal present at the outputs of AND gate A1 and AND gate A2 low, so that the switching elements S2 and S3 are rendered non-conducting, and the DC-AC converter no longer generates the current of alternating polarity, so that no current pulses are taken up from the supply voltage source anymore. An important advantage of the embodiment shown in FIG. 2 is that the means II need not comprise components which can withstand high power values, such as the switching element S1 in FIG. 1.

Figure 3:
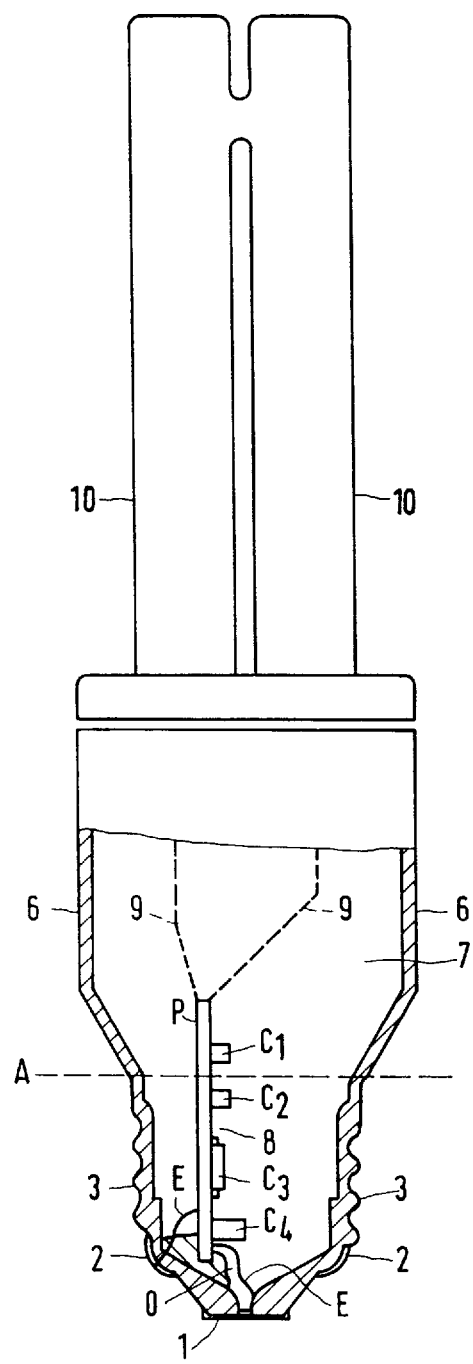
FIG. 3 diagrammatically shows an embodiment of a compact fluorescent lamp provided with a lamp cap having electrical contacts and a circuit arrangement according to the invention, in side elevation and partly in cross-section.

FIG. 3 shows electrical contacts 2 and 1 placed on a lamp cap 3 which merges into a housing 6 above the broken line. A discharge vessel 8 forms part of the compact fluorescent lamp. The electrical contacts are connected to a circuit arrangement, which is diagrammatically indicated as printed circuit board P and components C1–C4, via conductive connections E. The circuit arrangement is placed inside the space surrounded by the housing and the lamp cap and is provided with means I and means II according to the invention. The circuit arrangement is connected to ends of the discharge vessel via connections 9. Since the lamp cap of the embodiment shown in FIG. 3 corresponds to lamp caps used for incandescent lamps, it is possible to connect this embodiment of a compact fluorescent lamp to a lampholder which can also be used for incandescent lamps. This involves a relatively high risk of a user inadvertently, or out of ignorance, trying to dim the embodiment of the compact fluorescent lamp by means of a dimmer which is suitable for use in combination with incandescent lamps, but not for use in combination with a compact fluorescent lamp according to the present embodiment. The fact that the circuit arrangement in the embodiment of the lamp is provided with means I and means II, however, prevents that such a use of a dimmer in combination with the present embodiment of a compact fluorescent lamp will lead to damage in the circuit arrangement or a shorter useful life of the circuit arrangement.

In a practical realization of the circuit arrangement shown in FIG. 2, the duration of the given time interval Δt1 was chosen to be 500 ms and the given reference value was chosen to be 15. The circuit arrangement was supplied with a sinusoidal AC voltage with a frequency of 50 Hz. The circuit arrangement was used in combination with a dimmer which interrupts the supply voltage during a portion of each half cycle of the supply voltage. It was found that, with current pulses of comparatively high amplitude being derived from the supply voltage source as a result of the use of the dimmer, the means I and the means II switch off the circuit arrangement before these current pulses cause damage to components of the circuit arrangement.

We claim:

1. A circuit arrangement for operating a discharge lamp comprising:

input terminals for connection to an AC supply voltage source, rectifying means coupled to the input terminals for rectifying a supply voltage delivered by the supply voltage source, capacitive means coupled to the rectifying means, a DC-AC converter coupled to the capacitive means and provided with terminals for connection to a discharge lamp, means for detecting periodic current pulses having an amplitude greater than a given value W1, and means coupled to the detecting means for changing the operational state of the circuit arrangement only when a plurality of said periodic current pulses having an amplitude greater than the given value W1 are detected within a given time period.

2. A circuit arrangement as claimed in claim 1, wherein the detecting means comprises a current sensor and an integrator coupled to the current sensor.

3. A circuit arrangement as claimed in claim 1, wherein the detecting means comprises a current sensor, a comparator coupled to the current sensor, a counter coupled to the comparator, and a timer circuit coupled to the counter.

4. A circuit arrangement as claimed in claim 1, wherein the changing means comprises means for interrupting the supply voltage to the circuit arrangement.

5. A circuit arrangement as claimed in claim 1, wherein the DC-AC converter comprises one or several switching elements which are rendered alternately conducting and non-conducting during lamp operation, and the changing means comprises means for rendering the one or several switching elements non-conducting.

6. A compact discharge lamp provided with a lamp cap having electrical contacts and with the circuit arrangement as claimed in claim 1.

7. The circuit arrangement as claimed in claim 1 wherein said detecting means comprises a current sensor responsive to periodic current pulses determined by a pulsatory current flowing through said input terminals.

8. An operating circuit for a discharge comprising;

input terminals for connection to a source of DC pulsatory voltage, a capacitor coupled to said input terminals, a DC-AC converter coupled to the capacitor and comprising terminals for connection to the discharge lamp, means for detecting a plurality of periodic current pulses, having an amplitude greater than a given value W1, and which flow through at least one of said input terminals, and means coupled to the detecting means for changing the operation state of the operating circuit when the plurality of said periodic current pulses having an amplitude greater than the given value W1 are detected within a given time period.

9. The operating circuit for a discharge lamp as claimed in claim 8, wherein the detecting means comprises a current sensor and said given amplitude value W1 is determined by safe operating levels for components of the operating circuit.

10. The operating circuit for a discharge lamp as claimed in claim 8 wherein the detecting means comprises a current sensor and an integrator having its input coupled to the current sensor and its output coupled to a control input of the changing means, said integrator supplying a control signal to the changing means only when a large number of said periodic current pulses occur within a short time period.

11. The operating circuit for a discharge lamp as claimed in claim 8 wherein the detecting means comprises;

a current sensor for sensing current flow through said at least one of said input terminals, a comparator having an input coupled to the current sensor, a counter having input means coupled to an output of the comparator and to an output of a timer circuit, and the changing means is controlled by the counter and in turn controls a semiconductor switching element of the DC-AC converter so as to turn off the DC-AC converter only when said plurality of periodic current pulses are detected within said given time period.

12. The operating circuit for a discharge lamp as claimed in claim 8 wherein the changing means comprises means for interrupting the source of DC pulsatory voltage to the operating circuit.

13. The operating circuit for a discharge lamp as claimed in claim 8 wherein said detecting means comprises a current sensor responsive to periodic current pulses determined by a pulsatory current flowing through said input terminals.

* * * * *